United States Patent
Liu et al.

(10) Patent No.: US 11,507,813 B2
(45) Date of Patent: Nov. 22, 2022

(54) MODULO OPERATION UNIT

(71) Applicant: Arm Limited, Cambridge (GB)

(72) Inventors: Zhi-Gang Liu, Westford, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 252 days.

(21) Appl. No.: 16/889,031

(22) Filed: Jun. 1, 2020

(65) Prior Publication Data

US 2021/0374509 A1 Dec. 2, 2021

(51) Int. Cl.
| | |
|---|---|
| G06N 3/063 | (2006.01) |
| G06F 7/02 | (2006.01) |
| G06F 7/50 | (2006.01) |
| G06F 7/72 | (2006.01) |
| G06F 9/38 | (2018.01) |
| G06F 9/50 | (2006.01) |
| G06N 3/08 | (2006.01) |

(52) U.S. Cl.
CPC .............. *G06N 3/063* (2013.01); *G06F 7/02* (2013.01); *G06F 7/50* (2013.01); *G06F 7/72* (2013.01); *G06F 9/3893* (2013.01); *G06F 9/5027* (2013.01); *G06N 3/084* (2013.01)

(58) Field of Classification Search
CPC ...... G06N 3/063; G06N 3/084; G06N 3/0481; G06N 3/0454; G06F 9/5027; G06F 7/02; G06F 7/72; G06F 7/50; G06F 9/3893
USPC .......................................................... 706/41
See application file for complete search history.

(56) References Cited

U.S. PATENT DOCUMENTS

| | | | | |
|---|---|---|---|---|
| 7,472,154 B2* | 12/2008 | Yamada | ................... | G06F 7/728 708/491 |
| 8,880,577 B2* | 11/2014 | Woo | ........................ | G06F 7/535 708/650 |
| 2010/0146027 A1* | 6/2010 | Dao | ......................... | G06F 11/08 708/491 |
| 2011/0153701 A1* | 6/2011 | Moudgill | ................. | G06F 7/722 708/492 |
| 2013/0204916 A1* | 8/2013 | Boersma | ................... | G06F 7/38 708/491 |
| 2020/0310761 A1* | 10/2020 | Rossi | ....................... | G06F 7/729 |

OTHER PUBLICATIONS

Chen et al., "Eyeriss: A Spatial Architecture for Energy-Efficient Dataflow for Convolutional Neural Networks", ISCA '17, https://people.csail.mit.edu/emer/papers/2016.06.isca.eyeriss_architecture.pdf, Dec. 19, 2016.
Jouppi et al., "In-Datacenter Performance Analysis of a Tensor Processing Unit," 44th International Symposium on Computer Architecture (ISCA), Toronto, Canada, Jun. 24-28, 2017.
Lavin, A., "Fast algorithms for convolutional neural networks," arXiv:1509.09308v2 Nov. 10, 2015.
Butler et al., "Fast Hardware Computation of x mod z," 2011 IEEE International Symposium On Parallel and Distributed Processing Workshops and PhD Forum (IPDPSW), IEEE, May 16, 2011 (May 16, 2011), pp. 294-297.

* cited by examiner

Primary Examiner — Tan V Mai
(74) Attorney, Agent, or Firm — Leveque IP Law, P.C.

(57) ABSTRACT

The present disclosure advantageously provides a modulo operation unit that includes a first input configured to receive operand data, a second input configured to receive modulus data, an initial modulo stage, a sequence of intermediate modulo stages, and a final modulo stage.

20 Claims, 8 Drawing Sheets

$$A^T = \begin{pmatrix} 1 & 1 & 1 & 1 & 1 & 1 & 1 & 1 & 1 & 1 & 1 & 0 \\ 0 & 1 & -1 & 2 & -2 & 3 & -3 & 4 & -4 & 5 & -5 & 0 \\ 0 & 1 & 1 & 4 & 4 & 9 & 9 & 16 & 16 & 25 & 25 & 0 \\ 0 & 1 & -1 & 8 & -8 & 27 & -27 & 64 & -64 & 125 & -125 & 0 \\ 0 & 1 & 1 & 16 & 16 & 81 & 81 & 256 & 256 & 625 & 625 & 0 \\ 0 & 1 & -1 & 32 & -32 & 243 & -243 & 1024 & -1024 & 3125 & -3125 & 0 \\ 0 & 1 & 1 & 64 & 64 & 729 & 729 & 4096 & 4096 & 15625 & 15625 & 0 \\ 0 & 1 & -1 & 128 & -128 & 2187 & -2187 & 16384 & -16384 & 78125 & -78125 & 0 \\ 0 & 1 & 1 & 256 & 256 & 6561 & 6561 & 65536 & 65536 & 390625 & 390625 & 0 \\ 0 & 1 & -1 & 512 & -512 & 19683 & -19683 & 262144 & -262144 & 1953125 & -1953125 & 1 \end{pmatrix}$$

$$G = \begin{pmatrix} \frac{1}{14400} & 0 & 0 \\ \frac{1}{17280} & \frac{1}{17280} & \frac{1}{17280} \\ \frac{1}{17280} & \frac{-1}{17280} & \frac{1}{17280} \\ \frac{1}{30240} & \frac{1}{15120} & \frac{1}{7560} \\ \frac{1}{30240} & \frac{-1}{1520} & \frac{1}{7560} \\ \frac{1}{80640} & \frac{1}{26880} & \frac{1}{8960} \\ \frac{1}{80640} & \frac{-1}{26880} & \frac{1}{8960} \\ \frac{1}{362880} & \frac{1}{90720} & \frac{1}{22680} \\ \frac{1}{362880} & \frac{-1}{90720} & \frac{1}{22680} \\ \frac{1}{3628800} & \frac{1}{725760} & \frac{1}{145152} \\ \frac{1}{3628800} & \frac{-1}{725760} & \frac{1}{145152} \\ 0 & 0 & 1 \end{pmatrix} = \frac{1}{3628800} G'; \quad G' = \begin{pmatrix} 252 & 0 & 0 \\ 210 & 210 & 210 \\ 210 & -210 & 210 \\ 120 & 240 & 480 \\ 120 & -240 & 480 \\ 45 & 135 & 405 \\ 45 & -135 & 405 \\ 10 & 40 & 160 \\ 10 & -40 & 160 \\ 1 & 5 & 25 \\ 1 & -5 & 25 \\ 0 & 0 & 3628800 \end{pmatrix}$$

$$B^T = \begin{pmatrix} 14400 & 0 & -21076 & 0 & 7645 & 0 & -1023 & 0 & 55 & 0 & -1 & 0 \\ 0 & 14400 & 14400 & -6676 & -6676 & 969 & 969 & -54 & -54 & 1 & 1 & 0 \\ 0 & -14400 & 14400 & 6676 & -6676 & -969 & 969 & 54 & -54 & -1 & 1 & 0 \\ 0 & -7200 & -3600 & 8738 & 4369 & -1638 & -819 & 102 & 51 & -2 & -1 & 0 \\ 0 & 7200 & -3600 & -8738 & 4369 & 1638 & -819 & -102 & 51 & 2 & -1 & 0 \\ 0 & 4800 & 1600 & -6492 & -2164 & 1827 & 609 & -138 & -46 & 3 & 1 & 0 \\ 0 & -4800 & 1600 & 6492 & -2164 & -1827 & 609 & 138 & -46 & -3 & 1 & 0 \\ 0 & -3600 & -900 & 5044 & 1261 & -1596 & -399 & 156 & 39 & -4 & -1 & 0 \\ 0 & 3600 & -900 & -5044 & 1261 & 1596 & -399 & -156 & 39 & 4 & -1 & 0 \\ 0 & 2880 & 576 & -4100 & -820 & 1365 & 273 & -150 & -30 & 5 & 1 & 0 \\ 0 & -2880 & 576 & 4100 & -820 & -1365 & 273 & 150 & -30 & -5 & 1 & 0 \\ 0 & -14400 & 0 & 21076 & 0 & -7645 & 0 & 1023 & 0 & -55 & 0 & 1 \end{pmatrix}$$

FIG. 5

$$A_{253}^T = \begin{pmatrix} 1 & 1 & 1 & 1 & 1 & 1 & 1 & 1 & 1 & 1 & 1 & 0 \\ 0 & 1 & -1 & 2 & -2 & 3 & -3 & 4 & -4 & 5 & -5 & 0 \\ 0 & 1 & 1 & 4 & 4 & 9 & 9 & 16 & 16 & 25 & 25 & 0 \\ 0 & 1 & -1 & 8 & -8 & 27 & -27 & 64 & -64 & 125 & -125 & 0 \\ 0 & 1 & 1 & 16 & 16 & 81 & 81 & 3 & 3 & 119 & 119 & 0 \\ 0 & 1 & -1 & 32 & -32 & -10 & 10 & 12 & -12 & 89 & -89 & 0 \\ 0 & 1 & 1 & 64 & 64 & -30 & -30 & 48 & 48 & -61 & -61 & 0 \\ 0 & 1 & -1 & -125 & 125 & -90 & 90 & -61 & 61 & -52 & 52 & 0 \\ 0 & 1 & 1 & 3 & 3 & -17 & -17 & 9 & 9 & -7 & -7 & 0 \\ 0 & 1 & -1 & 6 & -6 & -51 & 51 & 36 & -36 & -35 & 35 & 1 \end{pmatrix}$$

$$G_{253} = \begin{pmatrix} 12 & 0 & 0 \\ 10 & 10 & 10 \\ 10 & -10 & 10 \\ 78 & -97 & 59 \\ 78 & 97 & 59 \\ -34 & -102 & -53 \\ -34 & 102 & -53 \\ -120 & 26 & 104 \\ -120 & -26 & 104 \\ -12 & -60 & -47 \\ -12 & 60 & -47 \\ 0 & 0 & 1 \end{pmatrix}$$

$$B_{253}^T = \begin{pmatrix} -21 & 0 & -77 & 0 & 55 & 0 & -11 & 0 & 55 & 0 & -1 & 0 \\ 0 & -21 & -21 & -98 & -98 & -43 & -43 & -54 & -54 & 1 & 1 & 0 \\ 0 & 21 & -21 & 98 & -98 & 43 & -43 & 54 & -54 & -1 & 1 & 0 \\ 0 & -116 & -58 & -117 & 68 & -120 & -60 & 102 & 51 & -2 & -1 & 0 \\ 0 & 116 & -58 & 117 & 68 & 120 & -60 & -102 & 51 & 2 & -1 & 0 \\ 0 & -7 & 82 & 86 & 113 & 56 & 103 & 115 & -46 & 3 & 1 & 0 \\ 0 & 7 & 82 & -86 & 113 & -56 & 103 & -115 & -46 & -3 & 1 & 0 \\ 0 & -58 & 112 & -16 & -4 & -78 & 107 & -97 & 39 & -4 & -1 & 0 \\ 0 & 58 & 112 & 16 & -4 & 78 & 107 & 97 & 39 & 4 & -1 & 0 \\ 0 & 97 & 70 & -52 & -61 & 100 & 20 & 103 & -30 & 5 & 1 & 0 \\ 0 & -97 & 70 & 52 & -61 & -100 & 20 & -103 & -30 & -5 & 1 & 0 \\ 0 & 21 & 0 & 77 & 0 & -55 & 0 & 11 & 0 & -55 & 0 & 1 \end{pmatrix}$$

MODULO OPERATION UNIT

BACKGROUND

The present disclosure relates to computer systems. More particularly, the present disclosure relates to computer systems that include convolutional neural networks (CNNs).

Convolution is a fundamental component for many important machine learning (ML) applications that use CNNs, such as image recognition, classification and analysis, voice recognition, natural language processing, autonomous systems, robotic systems, etc. CNNs generally use higher precision numbers, such as single precision floating point numbers, double precision floating point numbers, etc., for model weights and activations. During training and inference, convolution operations within the CNN's convolutional layers are responsible for 90% or more of the computation load.

Different techniques may speed up this core operation, such as, for example, Winograd convolutions or other bilinear transformation forms. The Winograd convolution is applied over the field of rational numbers, and works particularly well for small transformation tile sizes, such as 3×3, due to the reduction in arithmetic complexity. Unfortunately, many Winograd transformation matrices become ill-conditioned when the size of the transformation tile becomes larger (e.g., greater than 8×8) because the magnitudes of the tile elements could be very large and very small at the same time.

BRIEF DESCRIPTION OF THE DRAWINGS

FIG. 5 depicts transform matrices $A^T$, G, and $B^T$, in accordance with an embodiment of the present disclosure.

FIG. 6 depicts transform matrices $A^T_{253}$, $G_{253}$ and $B^T_{253}$, in accordance with an embodiment of the present disclosure.

DETAILED DESCRIPTION

Figure 1:
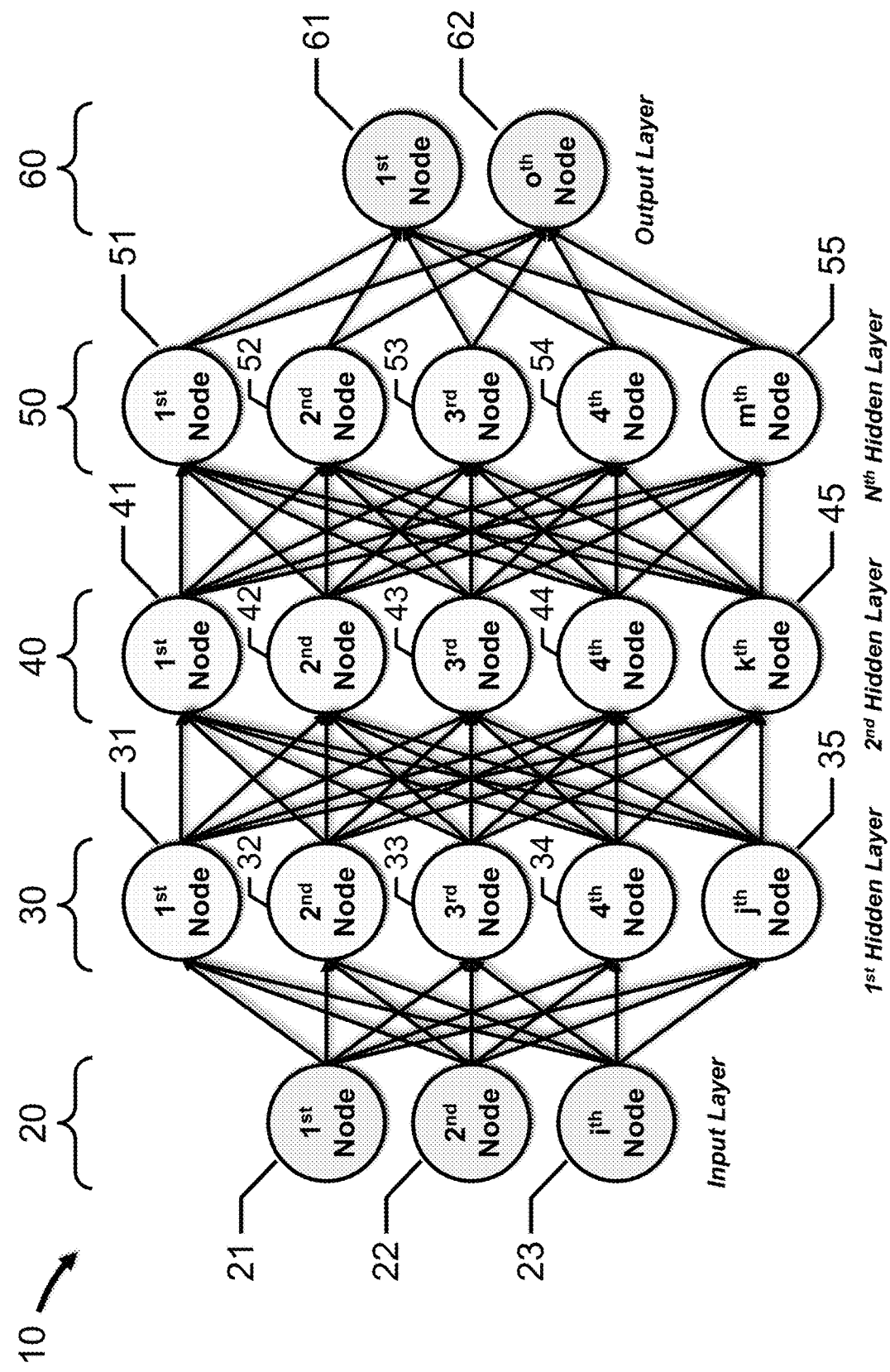
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide a modulo operation unit and method that accelerates residue number space (RNS) based convolution operations, such as, for example, the RNS-based Winograd convolution, performed by processors, microprocessors, ML hardware accelerators, etc.

In one embodiment, a hardware accelerator for execution of an artificial neural network (ANN) includes a computing engine (CE) and a modulo operation (MO) unit coupled to the CE. The MO unit includes a first input configured to receive operand data representing an operand value; a second input configured to receive modulus data representing a modulus value; an initial modulo stage, coupled to the first input and the second input, configured to generate a first residual value based on the modulus and the operand, and output the first residual value; a sequence of intermediate modulo stages, coupled to the second input, each intermediate modulo stage configured to receive the output from the initial modulo stage or a preceding intermediate modulo stage, generate an intermediate residual value based on the modulus data and the output from the initial modulo stage or the preceding intermediate modulo stage, and output the intermediate residual value; and a final modulo stage, coupled to the second input and the output from a last intermediate modulo stage, configured to generate a final residual value based on the modulus data and the output from the last intermediate modulo stage, and output the final residual value as a remainder.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
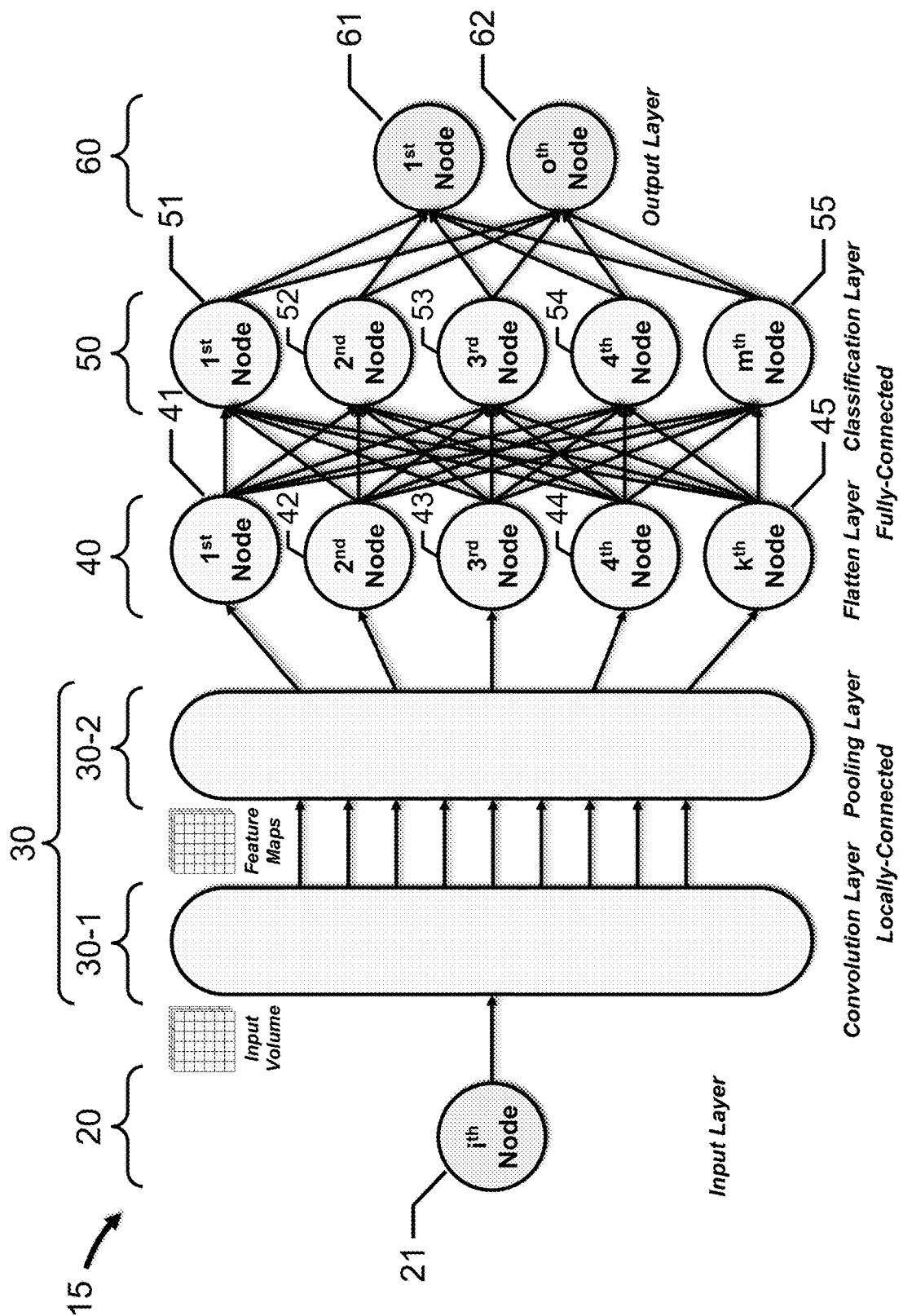
FIG. 2 depicts a convolutional neural network (CNN), in accordance with an embodiment of the present disclosure.

FIG. 2 depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3:
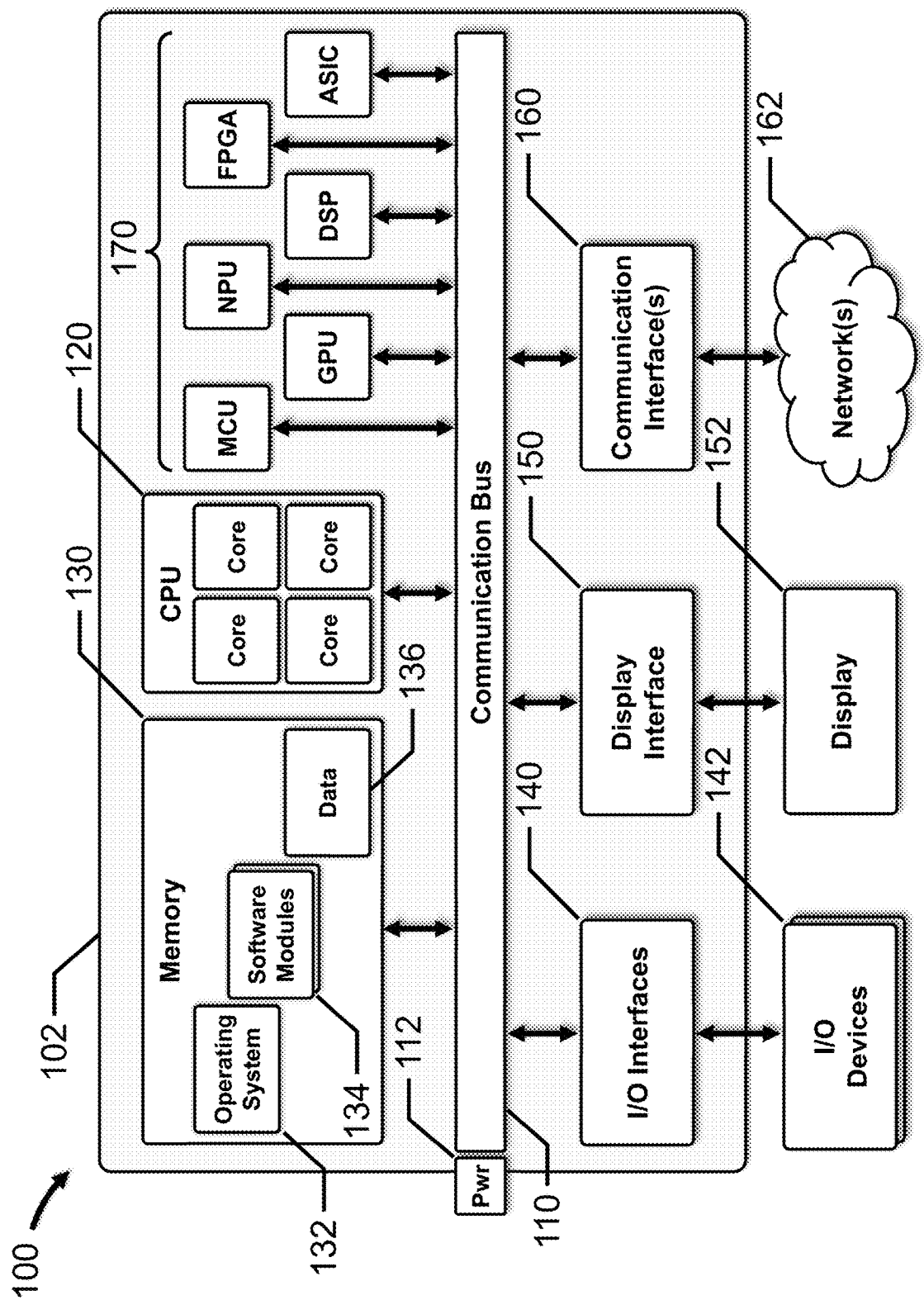
FIG. 3 depicts a block diagram of a system, in accordance with embodiments of the present disclosure.

FIG. 3 depicts a block diagram of system 100, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of system 100 are implemented as a system-on-chip (SoC) 102; in other embodiments, system 100 may be hosted on a traditional printed circuit board, motherboard, etc.

In certain embodiments, system 100 is an embedded system in which one or more of the components depicted in FIG. 3 are not present, such as, for example, I/O interfaces 140, I/O devices 142, display interface 150, display 152, etc. Additionally, certain components, when present, may be optimized based on various design constraints, such as, for example, power, area, etc., such as, for example, HA 170.

Communication bus 110 is a communication system that transfers data between processor 120, memory 130, I/O interfaces 140, display interface 150, communication interface 160, HAs 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores as well as various other modules.

In some embodiments, system 100 may include 2 processors 120, each containing multiple processing cores. For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In this example, the "big" processing cores include a memory management unit (MMU). In other embodiments, system 100 may be an embedded system that includes a single processor 120 with one or more processing cores, such as, for example, an Arm Cortex-M core. In these embodiments, processor 120 typically includes a memory protection unit (MPU).

In many embodiments, processor 120 may also be configured to execute classification-based ML models, such as, for example, ANNs, DNNs, CNNs, RNNs, SVM, Naïve Bayes etc. In these embodiments, processor 120 may provide the same functionality as a hardware accelerator, such as HA 170. For example, system 100 may be an embedded system that does not include HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute ML models, such as, for example, ANNs, CNNs, RNNs, etc., in support of various applications embodied by software modules 134. Generally, HAs 170 include one or more processors, coprocessors, processing engines (PEs), compute engines (CEs), etc., such as, for example, CPUs, GPUs, NPUs (e.g., the ARM ML Processor), DSPs, field programmable gate arrays (FPGAs), application specific integrated circuits (ASICs), controllers, microcontrollers, matrix multiplier circuits, MAC arrays, etc. HAs 170 also include a communications bus interface as well as non-volatile and/or volatile memories, such as, for example, ROM, flash memory, SRAM, DRAM, etc. For CNNs executing on GPUs, DSPs, NPUs, etc., generic matrix multiply (GEMM) operations consume a significant number of processor cycles due to the large number of multiplications that are required.

In many embodiments, HA 170 receives the ANN model and weights from memory 130 over communication bus 110 for storage in local volatile memory (e.g., SRAM, DRAM, etc.). In other embodiments, HA 170 receives a portion of the ANN model and weights from memory 130 over communication bus 110. In these embodiments, HA 170 determines the instructions needed to execute the ANN model or ANN model portion. In other embodiments, the ANN model (or ANN model portion) simply includes the instructions needed to execute the ANN model (or ANN model portion). In these embodiments, processor 120 determines the instructions needed to execute the ANN model, or, processor 120 divides the ANN model into ANN model portions, and then determines the instructions needed to execute each ANN model portion. The instructions are then provided to HA 170 as the ANN model or ANN model portion.

In further embodiments, HA 170 may store ANN models, instructions and weights in non-volatile memory. In certain embodiments, the ANN model may be directly implemented in hardware using PEs, CEs, matrix multiplier units, MAC arrays, etc. Generally, HA 170 receives input data from memory 130 over communication bus 110, and transmit output data to memory 130 over communication bus 110. In certain embodiments, the input data may be associated with a layer (or portion of a layer) of the ANN model, and the output data from that layer (or portion of that layer) may be transmitted to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Figure 4:
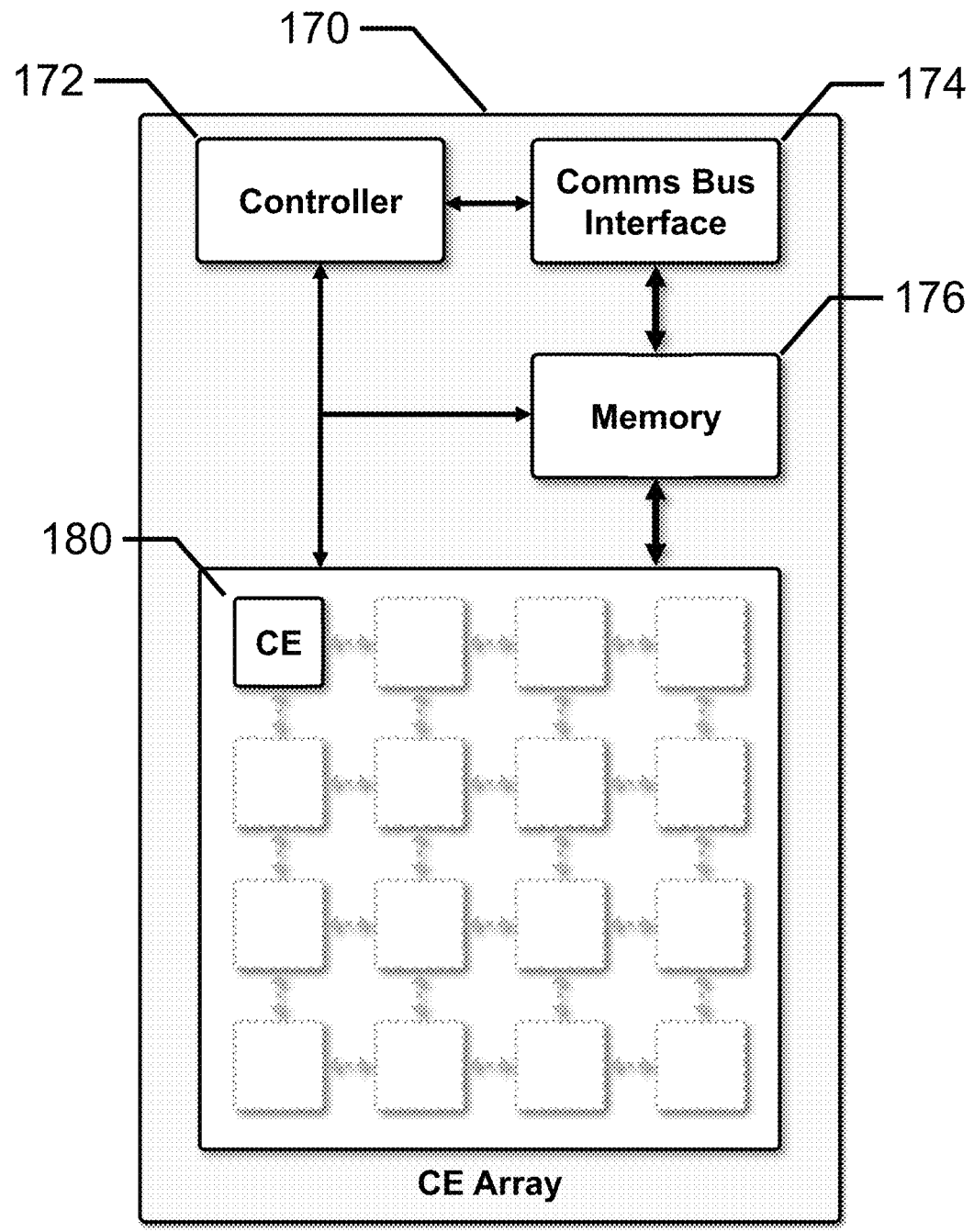
FIG. 4 depicts a hardware accelerator, in accordance with embodiments of the present disclosure.

FIG. 4 depicts a block diagram of hardware accelerator 170, in accordance with embodiments of the present disclosure.

HA 170 includes controller 172, communication bus interface 174, local memory 176 (e.g., SRAM, DRAM, etc.), and one or more CEs 180. Controller 172 generally controls the components, functions, data flow, etc. of HA 170. In other embodiments, a number of interconnected CEs 180 may be provided as array, such as, for example, 4 CEs, 8 CEs, 16 CEs (depicted in phantom in FIG. 4), 32 CEs, etc.

Multiple CEs 180 may be interconnected by a NoC using a ring topology, a star topology, a mesh topology, etc. In many embodiments, CEs 180 includes one or more MAC units, MAC engines, etc. Alternatively, multiple CEs 180 may be interconnected using a cross-bar switch, direct connections, etc. Generally, each CE 180 may execute a portion of an ANN model using a portion of the ANN weights.

As noted above, different techniques may speed up the convolution operation for CNNs, such as, for example, the Winograd convolution.

The Winograd convolution outperforms the standard convolution for "short" convolutions, as measured by the number of general multiplications. The Winograd convolution defines a polynomial over a field F as a mathematical expression given by EQ. 1:

$$f(x)=f_n x^n + f_{n-1} x^{n-1} + \ldots + f_1 x + f_0 \qquad \text{EQ. 1}$$

where x is symbolic and $f_0, \ldots, f_n$ are elements of the field F known as the coefficients. Linear and cyclic convolutions are then formulated as polynomial products; a linear convolution is given by $s(x)=g(x)d(x)$, while a cyclic convolution is given by $s(x)=g(x)d(x) \pmod{x^n-1}$.

Convolutions may be formulated using the Lagrange interpolation or the Chinese remainder theorem (CRT) for polynomials. The Winograd convolution calculates $s(x)=g(x)d(x) \pmod{m(x)}$, where $m(x)$, $g(x)$ and $d(x)$ are polynomials in F. The linear and cyclic convolutions may also be cast to this format. For example, setting $m(x)=x^n-1$ yields the cyclic convolution, which factors $m(x)$ into pairwise coprime polynomials $m^{(k)}(x)$ over a subfield of F, and constructs the solution using the CRT or interpolation.

For example, let F(m,r) denote the computation of m outputs with an r-tap FIR filter. F(m,r) consumes m+r−1 input values, the same number of general multiplications for the Winograd algorithm. The matrix form is given by EQ. 2:

$$Y = A^T[(Gg) \odot (B^T d)] \qquad \text{EQ. 2}$$

where $\odot$ represents element-wise multiplication (also known as the Hadamard product), g is the filter matrix, d is the input matrix, and $B^T$, G, and $A^T$ are the transform matrices.

Higher dimensional computations F(m×n,r×s) may be formulated by nesting the corresponding 1D algorithms F(m,r) and F(n,s) along each dimension. Square-shaped filters and activation patches are common, particularly in CNNs, and a 2D computation F(m×m,r×r) is given by EQ. 3:

$$Y = A^T[(GgG^T) \odot (B^T dB)]A \qquad \text{EQ. 3}$$

In many embodiments, $A^T$, G, and $B^T$, may be derived from the Vandermonde matrix V generated from N distinct Lagrange interpolation points $S_0$, $S_1$, $S_2$ and $S_N$.

$$V = \begin{pmatrix} 1 & S_0 & S_0^2 & \ldots & S_0^{N-1} \\ 1 & S_1 & S_1^2 & \ldots & S_1^{N-1} \\ 1 & S_2 & S_2^2 & \ldots & S_2^{N-1} \\ \vdots & \vdots & \vdots & \ldots & \vdots \\ 1 & S_{N-1} & S_{N-1}^2 & \ldots & S_{N-1}^{N-1} \end{pmatrix}_{N \times N} \qquad \text{EQ. 4}$$

$$A^T = V^T_{[0:M-1; 0:N-1]} \qquad \text{EQ. 5}$$
$$G = V_{[0:N-1; 0:R-1]}$$
$$B^T = V^{-T}$$

For example, a 12×12 transformation or F(10×10,3×3) has transform matrices $A^T$, G, and $B^T$ depicted in FIG. 5.

As noted above, many Winograd transform matrices become ill-conditioned when the transformation tile becomes larger (e.g., greater than 8×8) because the magnitudes of the tile elements could be very large and very small at the same time. Accordingly, to avoid numerical errors, Winograd transformations typically require high precision computation, such as, for example 32-bit floating point (FP32), even when the input feature maps are quantized into integer values.

Certain embodiments of the present disclosure advantageously compute the Winograd convolution completely within integer space. More particularly, instead of computing the Winograd convolution y using Winograd transform matrices directly, y is efficiently calculated in residue number space (RNS), i.e., y mod (m) for certain modulus m, as described in more detail below. This technique is not limited to Winograd convolutions, and may be applied to other transformations as well.

In one embodiment, m=253 and y mod (253) may be computed using the transform matrices $A^T_{253}$, $G_{253}$ and $B^T_{253}$ depicted in FIG. 6.

The RNS-based Winograd convolution may be computed using integer operations, such as, for example, low cost 8-bit signed integer (INT8) operations, which advantageously provides high power efficiency for mobile devices. The RNS-based Winograd convolution relies heavily on the modulo operation, which is an inherently slow, division-based operation that presents a processing bottleneck. As noted above, other embodiments of the present disclosure may compute the RNS-based convolution operation using different transformations and integer operations.

Embodiments of the present disclosure advantageously provide a modulo operation unit that advantageously accelerates RNS-based convolution operations, such as an RNS-based Winograd convolution, performed by processors, microprocessors, ML hardware accelerators, etc., such as, for example, CPUs, MPUs, GPUs, NPUs, etc. In many embodiments, the modulo operation unit increases the processing sped of an RNS-based Winograd convolution by a factor of four or more.

In its lowest form, an ANN operation, such as, for example, an RNS-based convolution operation, typically includes a vector multiplication and accumulation operation, which may be generally represented as follows:

$$d_i = ((a_i * b_i) + c_i) \qquad \text{EQ. 6}$$

where a, b, c and d are M element vectors, and i goes from 0 to M−1. Embodiments of the present invention extend this general representation to include the modulo operation, i.e., %, as follows:

$$d_i = ((a_i * b_i) + c_i) \% \, m \qquad \text{EQ. 7}$$

where m is a scalar modulus. When a, b, c and d are 8-bit signed integers, in certain embodiments, 128≤m<256, while in other embodiments, 64≥m<256.

In a further embodiment, the vector b may be replaced by a scalar value, b, as follows:

$$d_i = ((a_i * b) + c_i) \% \, m \qquad \text{EQ. 8}$$

Figure 7:
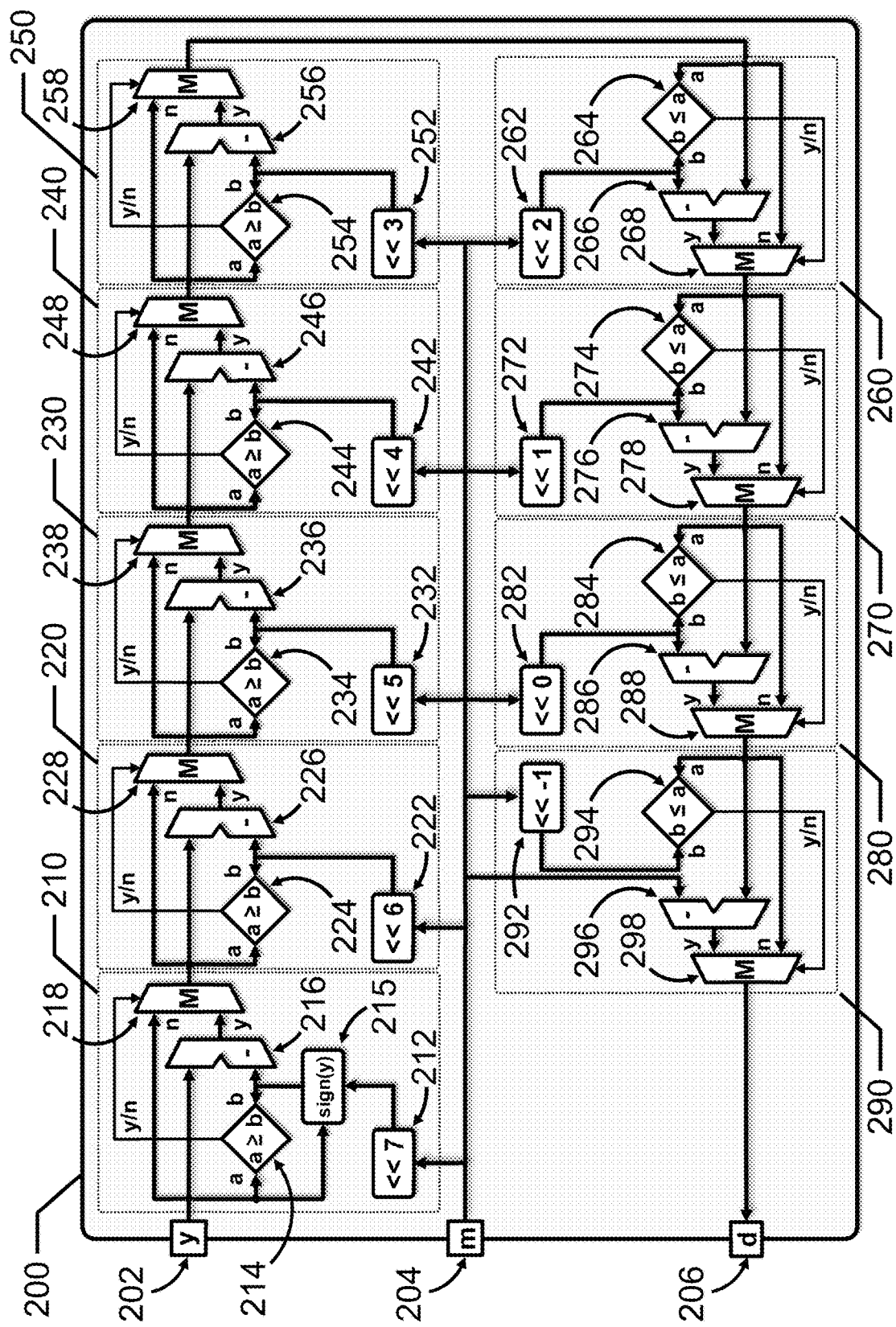
FIG. 7 depicts a modulo operation (MO) unit, in accordance with an embodiment of the present disclosure.

FIG. 7 depicts modulo operation (MO) unit 200, in accordance with an embodiment of the present disclosure.

MO unit 200 includes input 202, input 204, output 206 and several modulo stages. Generally, MO unit 200 includes three types of modulo stages, i.e., an initial modulo stage, a number of intermediate modulo stages and a final modulo stage. The intermediate modulo stages have the same components and couplings, the initial modulo stage has an additional component and slightly different couplings, and the final modulo stage has slightly different couplings, as described below. The number of intermediate modulo stages, N, may accommodate various considerations, such as, for example, the size of the element vectors a, b and c, the desired range for the modulus m, etc.

In many embodiments, the number of intermediate modulo stages N and the range for the modulus m may be related to one another. For example, in certain embodiments, the range for the modulus m may be given by:

$$2^{(N-1)} \leq m < 2^{(N)} \qquad \text{EQ. 9}$$

In other embodiments, the range for the modulus may be given by:

$$2^{(N-2)} \leq m < 2^{(N)} \qquad \text{EQ. 10}$$

Other modulus ranges are also contemplated by the present disclosure.

In the embodiment depicted in FIG. 7, MO unit 200 includes nine (9) modulo stages, i.e., initial modulo stage 210, seven (7) intermediate modulo stages 220, 230, 240, 250, 260, 270, 280, and final modulo stage 290. In this embodiment, N=7, 128 m<256, intermediate modulo stage 220 is the first intermediate modulo stage, and intermediate modulo stage 280 is the last intermediate modulo stage.

Input 202 is configured to receive an operand, such as, for example, the intermediate result, $y_i$, of the multiply and accumulate operation $y_i = *b_i) + c_i$, the intermediate result, $y_i$, of the multiply and accumulate operation $y_i = *b) + c_i$, etc. This operand may be provided by a MAC unit of CE 180, a CPU, etc. Input 204 is configured to receive the modulus, m, for the modulo operation $d_i = y_i \% \, m$. The modulus may be provided by CE 180, a CPU, etc. Output 206 is configured to output $d_i$, which is the remainder or result of the modulo operation $y_i \% \, m$ performed by MO unit 200.

Initial modulo stage 210 is coupled to input 202 and input 204, generates and then outputs a residual value that is based on the operand and the modulus m. Initial modulo stage 210 includes left hand shift (LHS) block 212, comparator 214, sign(y) block 215, subtractor 216 and multiplexor 218. LHS block 212 includes an input coupled to input 204, and an output coupled to one inputs of sign(y) block 215. Comparator 214 includes one input coupled to input 202, another input coupled to the output of sign(y) block 215, and an output coupled to multiplexor 218 that provides a control signal. Sign(y) block 215 includes one input coupled to input 202, another input coupled to the output of LHS block 212, and an output coupled to one of the inputs of comparator 214 and one of the inputs of subtractor 216. Subtractor 216 includes one input coupled to input 202, another input coupled to the output of sign(y) block 215, and an output coupled to one of the inputs of multiplexor 218. Multiplexor 218 includes one input coupled to input 202, another input coupled to the output of subtractor 216, a control input coupled to the output of comparator 214, and an output configured to output the residual value.

During operation, the operand is presented to input 202 and provided to the respective inputs of sign(y) block 215, comparator 214, subtractor 216 and multiplexor 218, while the modulus m is presented to input 204 and provided to the input of LHS block 212. LHS block 212 applies a 7-bit left hand shift to m, and outputs the shifted modulus, $m_{shift7}$, to sign(y) block 215. Sign(y) block 215 determines the sign of the operand (i.e., positive or negative), applies the sign to $m_{shift7}$, and then outputs the adjusted, shifted modulus, $m_{adj\_shift7}$, to comparator 214 and subtractor 216. Conceptually, sign(y) 215 multiplies $m_{shift7}$ by +1 if the sign is positive, and multiplies $m_{shift7}$ by −1 if the sign is negative. In one embodiment, if the sign is positive, $m_{shift7}$ is not modified and $m_{adj\_shift7}$ is the same as $m_{shift7}$, and, if the sign is negative, the bits of $m_{shift7}$ are flipped and one is added to create $m_{adj\_shift7}$. Subtractor 216 subtracts $m_{adj\_shift7}$ from the operand, and outputs the difference to one of the inputs of multiplexor 218. Comparator 214 compares the operand and $m_{adj\_shift7}$. If the operand is greater than or equal to $m_{adj\_shift7}$, then a positive control signal (e.g., a digital 1) is output to multiplexor 218. If the operand is less than $m_{adj\_shift7}$, then a negative control signal (e.g., a digital 0) is output to multiplexor 218. Multiplexor 218 outputs the difference received from subtractor 216 when the control signal from comparator 214 is positive (e.g., a digital 1), and outputs the operand received from input 202 when the control signal from comparator 214 is negative (e.g., a digital 0).

Intermediate modulo stage 220 is coupled to initial modulo stage 210 and input 204, generates and then outputs a residual value that is based on the output of initial modulo stage 210 and the modulus m. Intermediate modulo stage 220 includes LHS block 222, comparator 224, subtractor 226 and multiplexor 228. LHS block 222 includes an input coupled to input 204, and an output coupled to one of the inputs of comparator 224 and one of the inputs of subtractor 226. Comparator 224 includes one input coupled to the output of multiplexor 218, another input coupled to the output of LHS block 222, and an output coupled to multiplexor 228 that provides a control signal. Subtractor 226 includes one input coupled to the output of multiplexor 218, another input coupled to the output of LHS block 222, and an output coupled to one of the inputs of multiplexor 228. Multiplexor 228 includes one input coupled to the output of multiplexor 218, another input coupled to the output of subtractor 226, a control input coupled to the output of comparator 224, and an output configured to output the residual value.

During operation, the residual value output by multiplexor 218 is provided to the respective inputs of comparator 224, subtractor 226 and multiplexor 228, while the modulus m is provided to the input of LHS block 222. LHS block 222 applies a 6-bit left hand shift to m, and outputs the shifted modulus, $m_{shift6}$, to the respective inputs of comparator 224 and subtractor 226. Subtractor 226 subtracts $m_{shift6}$ from the residual value output by multiplexor 218, and outputs the difference to one of the inputs of multiplexor 228. Comparator 224 compares the residual value output by multiplexor 218 and $m_{shift6}$. If the residual value output by multiplexor 218 is greater than or equal to $m_{shift6}$, then a positive control signal (e.g., a digital 1) is output to multiplexor 228. If the residual value output by multiplexor 218 is less than $m_{shift6}$, then a negative control signal (e.g., a digital 0) is output to multiplexor 228. Multiplexor 228 outputs the difference received from subtractor 226 when the control signal from comparator 224 is positive (e.g., a digital 1), and outputs the residual value output by multiplexor 218 when the control signal from comparator 224 is negative (e.g., a digital 0).

Intermediate modulo stage 230 is coupled to intermediate modulo stage 220 and input 204, generates and then outputs a residual value that is based on the output of intermediate modulo stage 220 and the modulus m. Intermediate modulo stage 230 includes LHS block 232, comparator 234, subtractor 236 and multiplexor 238. LHS block 232 includes an input coupled to input 204, and an output coupled to one of the inputs of comparator 234 and one of the inputs of subtractor 236. Comparator 234 includes one input coupled to the output of multiplexor 228, another input coupled to the output of LHS block 232, and an output coupled to multiplexor 238 that provides a control signal. Subtractor 236 includes one input coupled to the output of multiplexor 228, another input coupled to the output of LHS block 232, and an output coupled to one of the inputs of multiplexor 238. Multiplexor 238 includes one input coupled to the output of multiplexor 228, another input coupled to the output of subtractor 236, a control input coupled to the output of comparator 234, and an output configured to output the residual value.

During operation, the residual value output by multiplexor 228 is provided to the respective inputs of comparator 234, subtractor 236 and multiplexor 238, while the modulus m is provided to the input of LHS block 232. LHS block 232 applies a 5-bit left hand shift to m, and outputs the shifted modulus, $m_{shift5}$, to the respective inputs of comparator 234 and subtractor 236. Subtractor 236 subtracts $m_{shift5}$ from the residual value output by multiplexor 228, and outputs the difference to one of the inputs of multiplexor 238. Comparator 234 compares the residual value output by multiplexor 228 and $m_{shift5}$. If the residual value output by multiplexor 228 is greater than or equal to $m_{shift5}$, then a positive control signal (e.g., a digital 1) is output to multiplexor 238. If the residual value output by multiplexor 228 is less than $m_{shift5}$, then a negative control signal (e.g., a digital 0) is output to multiplexor 238. Multiplexor 238 outputs the difference received from subtractor 236 when the control signal from comparator 234 is positive (e.g., a digital 1), and outputs the residual value output by multiplexor 228 when the control signal from comparator 234 is negative (e.g., a digital 0).

Intermediate modulo stage 240 is coupled to intermediate modulo stage 230 and input 204, generates and then outputs a residual value that is based on the output of intermediate modulo stage 230 and the modulus m. Intermediate modulo stage 240 includes LHS block 242, comparator 244, subtractor 246 and multiplexor 248. LHS block 242 includes an input coupled to input 204, and an output coupled to one of the inputs of comparator 244 and one of the inputs of subtractor 246. Comparator 244 includes one input coupled to the output of multiplexor 238, another input coupled to the output of LHS block 242, and an output coupled to multiplexor 248 that provides a control signal. Subtractor 246 includes one input coupled to the output of multiplexor 238, another input coupled to the output of LHS block 242, and an output coupled to one of the inputs of multiplexor 248. Multiplexor 248 includes one input coupled to the output of multiplexor 238, another input coupled to the output of subtractor 246, a control input coupled to the output of comparator 244, and an output configured to output the residual value.

During operation, the residual value output by multiplexor 238 is provided to the respective inputs of comparator 244, subtractor 246 and multiplexor 248, while the modulus m is provided to the input of LHS block 242. LHS block 242 applies a 4-bit left hand shift to m, and outputs the shifted modulus, $m_{shift4}$, to the respective inputs of comparator 244 and subtractor 246. Subtractor 246 subtracts $m_{shift4}$ from the residual value output by multiplexor 238, and outputs the difference to one of the inputs of multiplexor 248. Comparator 244 compares the residual value output by multiplexor 238 and $m_{shift4}$. If the residual value output by multiplexor 238 is greater than or equal to $m_{shift4}$, then a positive control signal (e.g., a digital 1) is output to multiplexor 248. If the residual value output by multiplexor 238 is less than $m_{shift4}$, then a negative control signal (e.g., a digital 0) is output to multiplexor 248. Multiplexor 248 outputs the difference received from subtractor 246 when the control signal from comparator 244 is positive (e.g., a digital 1), and outputs the residual value output by multiplexor 238 when the control signal from comparator 244 is negative (e.g., a digital 0).

Intermediate modulo stage 250 is coupled to intermediate modulo stage 240 and input 204, generates and then outputs a residual value that is based on the output of intermediate modulo stage 240 and the modulus m. Intermediate modulo stage 250 includes LHS block 252, comparator 254, subtractor 256 and multiplexor 258. LHS block 252 includes an input coupled to input 204, and an output coupled to one of the inputs of comparator 254 and one of the inputs of subtractor 256. Comparator 254 includes one input coupled to the output of multiplexor 248, another input coupled to the output of LHS block 252, and an output coupled to multiplexor 258 that provides a control signal. Subtractor 256 includes one input coupled to the output of multiplexor 248, another input coupled to the output of LHS block 252, and an output coupled to one of the inputs of multiplexor 258. Multiplexor 258 includes one input coupled to the output of multiplexor 248, another input coupled to the output of subtractor 256, a control input coupled to the output of comparator 254, and an output configured to output the residual value.

During operation, the residual value output by multiplexor 248 is provided to the respective inputs of comparator 254, subtractor 256 and multiplexor 258, while the modulus m is provided to the input of LHS block 252. LHS block 252 applies a 3-bit left hand shift to m, and outputs the shifted modulus, $m_{shift3}$, to the respective inputs of comparator 254 and subtractor 256. Subtractor 256 subtracts $m_{shift3}$ from the residual value output by multiplexor 248, and outputs the difference to one of the inputs of multiplexor 258. Comparator 254 compares the residual value output by multiplexor 248 and $m_{shift3}$. If the residual value output by multiplexor 248 is greater than or equal to $m_{shift3}$, then a positive control signal (e.g., a digital 1) is output to multiplexor 258. If the residual value output by multiplexor 248 is less than $m_{shift3}$, then a negative control signal (e.g., a digital 0) is output to multiplexor 258. Multiplexor 258 outputs the difference received from subtractor 256 when the control signal from comparator 254 is positive (e.g., a digital 1), and outputs the residual value output by multiplexor 248 when the control signal from comparator 254 is negative (e.g., a digital 0).

Intermediate modulo stage 260 is coupled to intermediate modulo stage 250 and input 204, generates and then outputs a residual value that is based on the output of intermediate modulo stage 250 and the modulus m. Intermediate modulo stage 260 includes LHS block 262, comparator 264, subtractor 266 and multiplexor 268. LHS block 262 includes an input coupled to input 204, and an output coupled to one of the inputs of comparator 264 and one of the inputs of subtractor 266. Comparator 264 includes one input coupled to the output of multiplexor 258, another input coupled to the output of LHS block 262, and an output coupled to multiplexor 268 that provides a control signal. Subtractor 266 includes one input coupled to the output of multiplexor 258, another input coupled to the output of LHS block 262, and an output coupled to one of the inputs of multiplexor 268. Multiplexor 268 includes one input coupled to the output of multiplexor 258, another input coupled to the output of subtractor 266, a control input coupled to the output of comparator 264, and an output configured to output the residual value.

During operation, the residual value output by multiplexor 258 is provided to the respective inputs of comparator 264, subtractor 266 and multiplexor 268, while the modulus m is provided to the input of LHS block 262. LHS block 262 applies a 2-bit left hand shift to m, and outputs the shifted modulus, $m_{shift2}$, to the respective inputs of comparator 264 and subtractor 266. Subtractor 266 subtracts $m_{shift2}$ from the residual value output by multiplexor 258, and outputs the difference to one of the inputs of multiplexor 268. Comparator 264 compares the residual value output by multiplexor 258 and $m_{shift2}$. If the residual value output by multiplexor 258 is greater than or equal to $m_{shift2}$, then a positive control signal (e.g., a digital 1) is output to multiplexor 268. If the residual value output by multiplexor 258 is less than $m_{shift2}$, then a negative control signal (e.g., a digital 0) is output to multiplexor 268. Multiplexor 268 outputs the difference received from subtractor 266 when the control signal from comparator 264 is positive (e.g., a digital 1), and outputs the residual value output by multiplexor 258 when the control signal from comparator 264 is negative (e.g., a digital 0).

Intermediate modulo stage 270 is coupled to intermediate modulo stage 260 and input 204, generates and then outputs a residual value that is based on the output of intermediate modulo stage 260 and the modulus m. Intermediate modulo stage 270 includes LHS block 272, comparator 274, subtractor 276 and multiplexor 278. LHS block 272 includes an input coupled to input 204, and an output coupled to one of the inputs of comparator 274 and one of the inputs of subtractor 276. Comparator 274 includes one input coupled to the output of multiplexor 268, another input coupled to the output of LHS block 272, and an output coupled to multiplexor 278 that provides a control signal. Subtractor 276 includes one input coupled to the output of multiplexor 268, another input coupled to the output of LHS block 272, and an output coupled to one of the inputs of multiplexor 278. Multiplexor 278 includes one input coupled to the output of multiplexor 268, another input coupled to the output of subtractor 276, a control input coupled to the output of comparator 274, and an output configured to output the residual value.

During operation, the residual value output by multiplexor 268 is provided to the respective inputs of comparator 274, subtractor 276 and multiplexor 278, while the modulus m is provided to the input of LHS block 272. LHS block 272 applies a 1-bit left hand shift to m, and outputs the shifted modulus, $m_{shift1}$, to the respective inputs of comparator 274 and subtractor 276. Subtractor 276 subtracts $m_{shift1}$ from the residual value output by multiplexor 268, and outputs the difference to one of the inputs of multiplexor 278. Comparator 274 compares the residual value output by multiplexor 268 and $m_{shift1}$. If the residual value output by multiplexor 268 is greater than or equal to $m_{shift1}$, then a positive control signal (e.g., a digital 1) is output to multiplexor 278. If the residual value output by multiplexor 268 is less than $m_{shift1}$, then a negative control signal (e.g., a digital 0) is output to multiplexor 278. Multiplexor 278 outputs the difference received from subtractor 276 when the control signal from comparator 274 is positive (e.g., a digital 1), and outputs the residual value output by multiplexor 268 when the control signal from comparator 274 is negative (e.g., a digital 0).

Intermediate modulo stage 280 is coupled to intermediate modulo stage 270 and input 204, generates and then outputs a residual value that is based on the output of intermediate modulo stage 270 and the modulus m. Intermediate modulo stage 280 includes LHS block 282, comparator 284, subtractor 286 and multiplexor 288. LHS block 282 includes an input coupled to input 204, and an output coupled to one of the inputs of comparator 284 and one of the inputs of subtractor 286. Comparator 284 includes one input coupled to the output of multiplexor 278, another input coupled to the output of LHS block 282, and an output coupled to multiplexor 288 that provides a control signal. Subtractor 286 includes one input coupled to the output of multiplexor 278, another input coupled to the output of LHS block 282, and an output coupled to one of the inputs of multiplexor 288. Multiplexor 288 includes one input coupled to the output of multiplexor 278, another input coupled to the output of subtractor 286, a control input coupled to the output of comparator 284, and an output configured to output the residual value.

During operation, the residual value output by multiplexor 278 is provided to the respective inputs of comparator 284, subtractor 286 and multiplexor 288, while the modulus m is provided to the input of LHS block 282. LHS block 282 applies a 0-bit left hand shift to m (i.e., no shift), and outputs the shifted modulus, $m_{shift0}$, to the respective inputs of comparator 284 and subtractor 286. Subtractor 286 subtracts $m_{shift0}$ from the residual value output by multiplexor 278, and outputs the difference to one of the inputs of multiplexor 288. Comparator 284 compares the residual value output by multiplexor 278 and $m_{shift0}$. If the residual value output by multiplexor 278 is greater than or equal to $m_{shift0}$, then a positive control signal (e.g., a digital 1) is output to multiplexor 288. If the residual value output by multiplexor 278 is less than $m_{shift0}$, then a negative control signal (e.g., a digital 0) is output to multiplexor 288. Multiplexor 288 outputs the difference received from subtractor 286 when the control signal from comparator 284 is positive (e.g., a digital 1), and outputs the residual value output by multiplexor 278 when the control signal from comparator 284 is negative (e.g., a digital 0).

Final modulo stage 290 is coupled to intermediate modulo stage 280 and input 204, generates and then outputs a residual value that is based on the output of intermediate modulo stage 280 and the modulus m. Final modulo stage 290 includes left LHS block 292, comparator 294, subtractor 296 and multiplexor 298. LHS block 292 includes an input coupled to input 204, and an output coupled to one of the inputs of comparator 294. Comparator 294 includes one input coupled to the output of multiplexor 288, another input coupled to the output of LHS block 292, and an output coupled to multiplexor 298 that provides a control signal. Subtractor 296 includes one input coupled to the output of multiplexor 288, another input coupled to input 204, and an output coupled to one of the inputs of multiplexor 298. Multiplexor 298 includes one input coupled to the output of multiplexor 288, another input coupled to the output of subtractor 296, a control input coupled to the output of comparator 294, and an output configured to output the residual value as the remainder.

During operation, the residual value output by multiplexor 288 is provided to the respective inputs of comparator 294, subtractor 296 and multiplexor 298, while the modulus m is provided to the input of LHS block 292 and one of the inputs of subtractor 296. LHS block 292 applies a −1 bit left hand shift to m (or a 1-bit right shift), and outputs the shifted modulus, $m_{shift-1}$, to the input of comparator 294. Subtractor 296 subtracts m from the residual value output by multiplexor 288, and outputs the difference to one of the inputs of multiplexor 298. Comparator 294 compares the residual value output by multiplexor 288 and $m_{shift-1}$. If the residual value output by multiplexor 288 is greater than or equal to $m_{shift-1}$, then a positive control signal (e.g., a digital 1) is output to multiplexor 298. If the residual value output by multiplexor 288 is less than $m_{shift-1}$, then a negative control signal (e.g., a digital 0) is output to multiplexor 298. Multiplexor 298 outputs the difference received from subtractor 296 when the control signal from comparator 294 is positive (e.g., a digital 1), and outputs the residual value output by multiplexor 288 when the control signal from comparator 294 is negative (e.g., a digital 0).

Output 206 is coupled to final modulo stage 290, receives the residual value from multiplexor 298, and outputs the residual value from multiplexor 298 as the remainder.

In one example of the operation of MO unit 200, m is equal to 253, $a_0$ is equal to 36, $b_0$ is equal to 72, co is equal to 0 and the operand, $y_0$, is equal to 2,592.

At initial modulo stage 210, LHS block 212 applies a 7-bit left hand shift to m (253), and outputs the shifted modulus $m_{shift7}$ (32,384) to sign(y) block 215. Sign(y) block 215 determines the sign of the operand (2,592) to be positive, applies the sign to $m_{shift7}$ (32,384) and then outputs the adjusted, shifted modulus, $m_{adj\_shift7}$ (32,384) to comparator 214 and subtractor 216. Subtractor 216 subtracts $m_{adj\_shift7}$ (32,384) from the operand (2,592), and outputs the difference (−29,792) to one of the inputs of multiplexor 218. Comparator 214 compares the operand (2,592) and $m_{adj\_shift7}$ (32,384), and outputs a negative control signal (e.g., a digital 0) to multiplexor 218 because 2,592 is not greater than or equal to 32,384. Multiplexor 218 outputs the operand (2,592) received from input 202 as the residual value because the control signal from comparator 214 is negative (e.g., a digital 0).

At intermediate modulo stage 220, LHS block 222 applies a 6-bit left hand shift tom (253), and outputs the shifted modulus $m_{shift6}$ (16,192) to the respective inputs of comparator 224 and subtractor 226. Subtractor 226 subtracts $m_{shift6}$ (16,192) from the residual value (2,592) output by multiplexor 218, and outputs the difference (−13,600) to one of the inputs of multiplexor 228. Comparator 224 compares the residual value (2,592) output by multiplexor 218 and $m_{shift6}$ (16,192), and outputs a negative control signal (e.g., a digital 0) to multiplexor 228 because 2,592 is not greater than or equal to 16,192. Multiplexor 228 outputs the residual value (2,592) output by multiplexor 218 as the residual value because the control signal from comparator 224 is negative (e.g., a digital 0).

At intermediate modulo stage 230, LHS block 232 applies a 5-bit left hand shift to m (253), and outputs the shifted modulus $m_{shift5}$ (8,096) to the respective inputs of comparator 234 and subtractor 236. Subtractor 236 subtracts $m_{shift5}$ (8,096) from the residual value (2,592) output by multiplexor 228, and outputs the difference (−5,504) to one of the inputs of multiplexor 238. Comparator 234 compares the residual value (2,592) output by multiplexor 228 and $m_{shift5}$ (8,096), and outputs a negative control signal (e.g., a digital 0) to multiplexor 238 because 2,592 is not greater than or equal to 8,096. Multiplexor 238 outputs the residual value (2,592) output by multiplexor 228 as the residual value because the control signal from comparator 234 is negative (e.g., a digital 0).

At intermediate modulo stage 240, LHS block 242 applies a 4-bit left hand shift to m (253), and outputs the shifted modulus $m_{shift4}$ (4,048) to the respective inputs of comparator 244 and subtractor 246. Subtractor 246 subtracts $m_{shift4}$ (4,048) from the residual value (2,592) output by multiplexor 238, and outputs the difference (−1,456) to one of the inputs of multiplexor 248. Comparator 244 compares the residual value (2,592) output by multiplexor 238 and $m_{shift4}$ (4,048), and outputs a negative control signal (e.g., a digital 0) to multiplexor 248 because 2,592 is not greater than or equal to 4,048. Multiplexor 248 outputs the residual value (2,592) output by multiplexor 238 as the residual value because the control signal from comparator 244 is negative (e.g., a digital 0).

At intermediate modulo stage 250, LHS block 252 applies a 3-bit left hand shift to m (253), and outputs the shifted modulus $m_{shift3}$ (2,024) to the respective inputs of comparator 254 and subtractor 256. Subtractor 256 subtracts $m_{shift3}$ (2,024) from the residual value (2,592) output by multiplexor 248, and outputs the difference (568) to one of the inputs of multiplexor 258. Comparator 254 compares the residual value (2,592) output by multiplexor 248 and $m_{shift3}$ (2,024), and outputs a positive control signal (e.g., a digital 1) to multiplexor 258 because 2,592 is greater than or equal to 2,024. Multiplexor 258 outputs the difference (568) output by subtractor 256 as the residual value because the control signal from comparator 254 is positive (e.g., a digital 1).

At intermediate modulo stage 260, LHS block 262 applies a 2-bit left hand shift to m (253), and outputs the shifted modulus $m_{shift2}$ (1,012) to the respective inputs of comparator 264 and subtractor 266. Subtractor 266 subtracts $m_{shift2}$ (1,012) from the residual value (568) output by multiplexor 258, and outputs the difference (−444) to one of the inputs of multiplexor 268. Comparator 264 compares the difference (568) output by multiplexor 258 and $m_{shift2}$ (1,012), and outputs a negative control signal (e.g., a digital 0) to multiplexor 268 because 568 is not greater than or equal to 1,012. Multiplexor 268 outputs the residual value (568) output by multiplexor 258 as the residual value because the control signal from comparator 264 is negative (e.g., a digital 0).

At intermediate modulo stage 270, LHS block 272 applies a 1-bit left hand shift to m (253), and outputs the shifted modulus $m_{shift1}$ (506) to the respective inputs of comparator 274 and subtractor 276. Subtractor 276 subtracts $m_{shift1}$ (506) from the residual value (568) output by multiplexor 268, and outputs the difference (62) to one of the inputs of multiplexor 278. Comparator 274 compares the difference (568) output by multiplexor 268 and $m_{shift1}$ (506), and outputs a positive control signal (e.g., a digital 1) to multiplexor 278 because 568 is greater than or equal to 506. Multiplexor 278 outputs the difference (62) output by subtractor 276 as the residual value because the control signal from comparator 274 is positive (e.g., a digital 1).

At intermediate modulo stage 280, LHS block 282 applies a 0-bit left hand shift to m (253), and outputs the shifted modulus $m_{shift0}$ (253) to the respective inputs of comparator 284 and subtractor 286. Subtractor 286 subtracts $m_{shift0}$ (253) from the residual value (62) output by multiplexor 278, and outputs the difference (−191) to one of the inputs of multiplexor 288. Comparator 284 compares the difference (62) output by multiplexor 278 and $m_{shift0}$ (253), and outputs a negative control signal (e.g., a digital 0) to multiplexor 288 because 62 is not greater than or equal to 253. Multiplexor 288 outputs the residual value (62) output by multiplexor 278 as the residual value because the control signal from comparator 284 is negative (e.g., a digital 0).

At final modulo stage 290, LHS block 292 applies a −1 bit left hand shift to m (253), and outputs the shifted modulus $m_{shift-1}$ (126) to the respective inputs of comparator 294 and subtractor 296. Subtractor 296 subtracts $m_{shift-1}$ (126) from the residual value (62) output by multiplexor 288, and outputs the difference (−64) to one of the inputs of multiplexor 298. Comparator 294 compares the difference (62) output by multiplexor 288 and $m_{shift-1}$ (126), and outputs a negative control signal (e.g., a digital 0) to multiplexor 298 because 62 is not greater than or equal to 126. Multiplexor 298 outputs the residual value (62) output by multiplexor 288 as the residual value because the control signal from comparator 294 is negative (e.g., a digital 0).

Output 206 receives the difference (62) from multiplexor 298, and outputs the difference (62) from multiplexor 298 as the remainder (62).

In another example of the operation of MO unit 200, m is equal to 253, $a_1$ is equal to −36, $b_1$ is equal to 72, $c_1$ is equal to 0 and the operand, $y_1$, is equal to −2,592.

At initial modulo stage 210, LHS block 212 applies a 7-bit left hand shift to m (253), and outputs the shifted modulus $m_{shift7}$ (32,384) to sign(y) block 215. Sign(y) block 215 determines the sign of the operand (−2,592) to be negative, applies the sign to $m_{shift7}$ (−32,384) and then outputs the adjusted, shifted modulus, $m_{adj\_shift7}$ (−32,384) to comparator 214 and subtractor 216. Subtractor 216 subtracts $m_{adj\_shift7}$ (−32,384) from the operand (−2,592), and outputs the difference (29,792) to one of the inputs of multiplexor 218. Comparator 214 compares the operand (−2,592) and $m_{adj\_shift7}$ (−32,384), and outputs a positive control signal (e.g., a digital 1) to multiplexor 218 because −2,592 is greater than or equal to −32,384. Multiplexor 218 outputs the difference (29,792) received from subtractor 216 as the residual value because the control signal from comparator 214 is positive (e.g., a digital 1).

At intermediate modulo stage 220, LHS block 222 applies a 6-bit left hand shift tom (253), and outputs the shifted modulus $m_{shift6}$ (16,192) to the respective inputs of comparator 224 and subtractor 226. Subtractor 226 subtracts $m_{shift6}$ (16,192) from the residual value (29,792) output by multiplexor 218, and outputs the difference (13,600) to one of the inputs of multiplexor 228. Comparator 224 compares the residual value (29,792) output by multiplexor 218 and $m_{shift6}$ (16,192), and outputs a positive control signal (e.g., a digital 1) to multiplexor 228 because 29,792 is greater than or equal to 16,192. Multiplexor 228 outputs the difference (13,600) received from subtractor 226 as the residual value because the control signal from comparator 224 is positive (e.g., a digital 1).

At intermediate modulo stage 230, LHS block 232 applies a 5-bit left hand shift to m (253), and outputs the shifted modulus $m_{shift5}$ (8,096) to the respective inputs of comparator 234 and subtractor 236. Subtractor 236 subtracts $m_{shift5}$ (8,096) from the residual value (13,600) output by multiplexor 228, and outputs the difference (5,504) to one of the inputs of multiplexor 238. Comparator 234 compares the residual value (13,600) output by multiplexor 228 and $m_{shift5}$ (8,096), and outputs a positive control signal (e.g., a digital 1) to multiplexor 238 because 13,600 is greater than or equal to 8,096. Multiplexor 238 outputs the difference (5,504) received from subtractor 236 as the residual value because the control signal from comparator 234 is positive (e.g., a digital 1).

At intermediate modulo stage 240, LHS block 242 applies a 4-bit left hand shift to m (253), and outputs the shifted modulus $m_{shift4}$ (4,048) to the respective inputs of comparator 244 and subtractor 246. Subtractor 246 subtracts $m_{shift4}$ (4,048) from the residual value (5,504) output by multiplexor 238, and outputs the difference (1,456) to one of the inputs of multiplexor 248. Comparator 244 compares the residual value (5,504) output by multiplexor 238 and $m_{shift4}$ (4,048), and outputs a positive control signal (e.g., a digital 1) to multiplexor 248 because 5,504 is greater than or equal to 4,048. Multiplexor 248 outputs the difference (1,456) received from subtractor 246 as the residual value because the control signal from comparator 244 is positive (e.g., a digital 1).

At intermediate modulo stage 250, LHS block 252 applies a 3-bit left hand shift to m (253), and outputs the shifted modulus $m_{shift3}$ (2,024) to the respective inputs of comparator 254 and subtractor 256. Subtractor 256 subtracts $m_{shift3}$ (2,024) from the residual value (1,456) output by multiplexor 248, and outputs the difference (−568) to one of the inputs of multiplexor 258. Comparator 254 compares the residual value (1,456) output by multiplexor 248 and $m_{shift3}$ (2,024), and outputs a negative control signal (e.g., a digital 0) to multiplexor 258 because 1,456 is not greater than or equal to 2,024. Multiplexor 258 outputs the residual value (1,456) received from multiplexor 248 as the residual value because the control signal from comparator 254 is negative (e.g., a digital 0).

At intermediate modulo stage 260, LHS block 262 applies a 2-bit left hand shift to m (253), and outputs the shifted modulus $m_{shift2}$ (1,012) to the respective inputs of comparator 264 and subtractor 266. Subtractor 266 subtracts $m_{shift2}$ (1,012) from the residual value (1,456) output by multiplexor 258, and outputs the difference (444) to one of the inputs of multiplexor 268. Comparator 264 compares the residual value (1,456) output by multiplexor 258 and $m_{shift2}$ (1,012), and outputs a positive control signal (e.g., a digital 1) to multiplexor 268 because 1,456 is greater than or equal to 1,012. Multiplexor 268 outputs the difference (444) received from subtractor 266 as the residual value because the control signal from comparator 264 is positive (e.g., a digital 1).

At intermediate modulo stage 270, LHS block 272 applies a 2-bit left hand shift to m (253), and outputs the shifted modulus $m_{shift2}$ (506) to the respective inputs of comparator 274 and subtractor 276. Subtractor 276 subtracts $m_{shift2}$ (506) from the residual value (444) output by multiplexor 268, and outputs the difference (−62) to one of the inputs of multiplexor 278. Comparator 274 compares the residual value (444) output by multiplexor 268 and $m_{shift2}$ (506), and outputs a negative control signal (e.g., a digital 0) to multiplexor 278 because 444 is not greater than or equal to 506. Multiplexor 278 outputs the residual value (444) received from multiplexor 268 as the residual value because the control signal from comparator 274 is negative (e.g., a digital 0).

At intermediate modulo stage 280, LHS block 282 applies a 0-bit left hand shift to m (253), and outputs the shifted modulus $m_{shift0}$ (253) to the respective inputs of comparator 284 and subtractor 286. Subtractor 286 subtracts $m_{shift0}$ (253) from the residual value (444) output by multiplexor 278, and outputs the difference (191) to one of the inputs of multiplexor 288. Comparator 284 compares the residual value (444) output by multiplexor 278 and $m_{shift0}$ (253), and outputs a positive control signal (e.g., a digital 1) to multiplexor 288 because 444 is greater than or equal to 253. Multiplexor 288 outputs the difference (191) received from subtractor 286 as the residual value because the control signal from comparator 284 is positive (e.g., a digital 1).

At final modulo stage 290, LHS block 292 applies a −1 bit left hand shift to m (253), and outputs the shifted modulus $m_{shift-1}$ (126) to the respective inputs of comparator 294 and subtractor 296. Subtractor 296 subtracts m (253) from the residual value (191) output by multiplexor 288, and outputs the difference (−62) to one of the inputs of multiplexor 298.

Comparator 294 compares the residual value (191) output by multiplexor 288 and $m_{shift-1}$ (126), and outputs a positive control signal (e.g., a digital 1) to multiplexor 298 because 191 is greater than or equal to 126. Multiplexor 298 outputs the difference (−62) received from subtractor 296 as the residual value because the control signal from comparator 294 is positive (e.g., a digital 1).

Output 206 receives the difference (−62) from multiplexor 298, and outputs the difference (−62) from multiplexor 298 as the remainder (−62).

Figure 8:
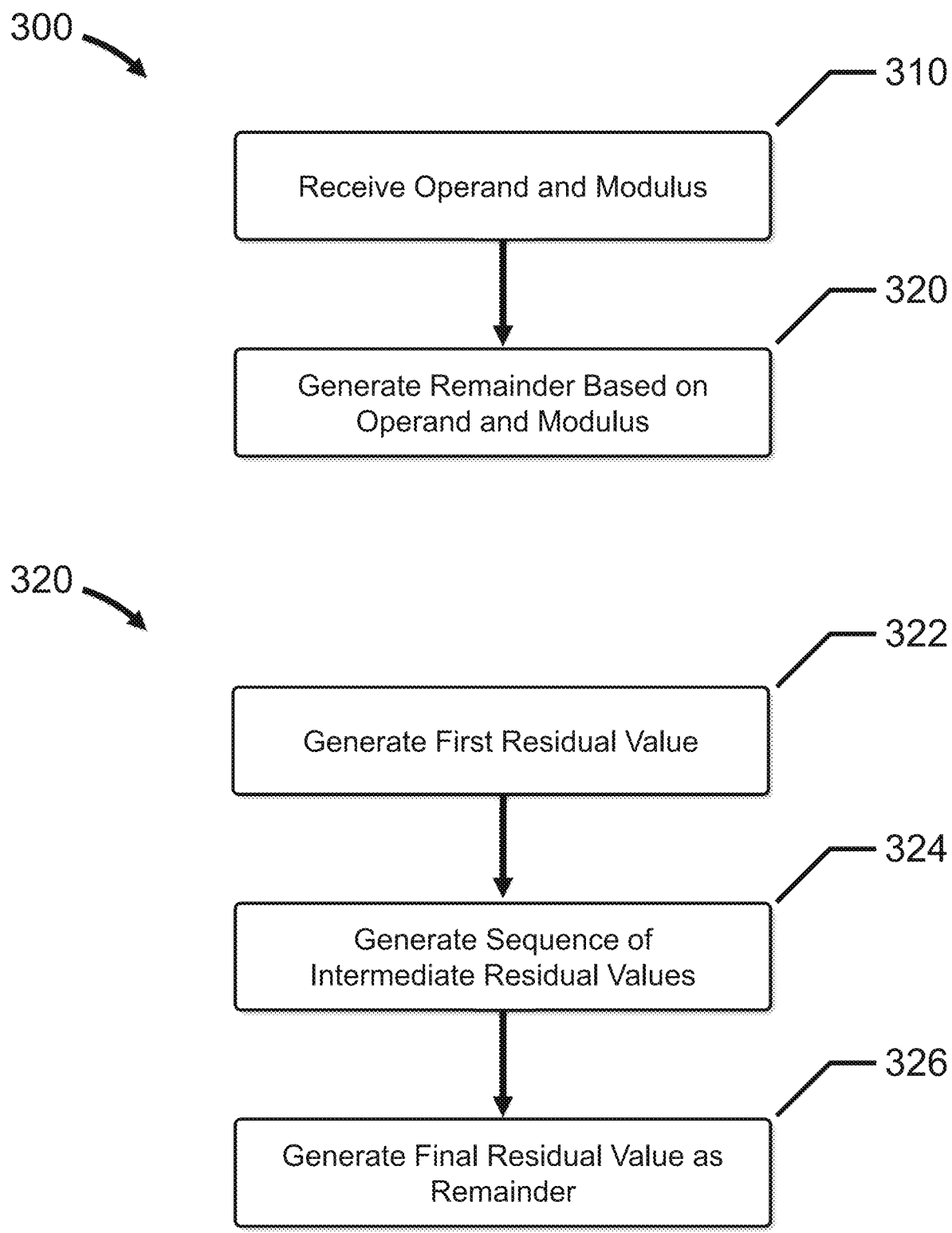
FIG. 8 depicts a flow diagram presenting functionality for performing a modulo operation, in accordance with embodiments of the present disclosure.

FIG. 8 depicts flow diagram 300 presenting functionality for performing a modulo operation, in accordance with an embodiment of the present disclosure.

At 310, an operand and a modulus are received.

At 320, a remainder is generated based on the operand and the modulus, which includes the functionality at 322, 324 and 326. At 322, a first residual value is generated by an initial modulo stage. At 324, a sequence of intermediate residual values is generated by a sequence of intermediate modulo stages. At 326, a final residual value is generated by a final modulo stage. The final residual value is the remainder.

Embodiments of the present disclosure advantageously provide a modulo operation unit that advantageously accelerates RNS-based convolution operations, such as the RNS-based Winograd convolution, performed by processors, microprocessors, NL hardware accelerators, etc., such as, for example, CPUs, MPUs, GPUs, NPUs, etc.

The embodiments described herein are combinable.

In one embodiment, a hardware accelerator for execution of an artificial neural network (ANN) includes a computing engine (CE) and a modulo operation (MO) unit, coupled to the CE, configured to provide a modulation operation during ANN operations. The unit includes a first input configured to receive operand data representing an operand value; a second input configured to receive modulus data representing a modulus value; an initial modulo stage, coupled to the first input and the second input, configured to generate a first residual value based on the modulus data and the operand data, and output the first residual value; a sequence of intermediate modulo stages, coupled to the second input, each intermediate modulo stage configured to receive the output from the initial modulo stage or a preceding intermediate modulo stage, generate an intermediate residual value based on the modulus data and the output from the initial modulo stage or the preceding intermediate modulo stage, and output the intermediate residual value; and a final modulo stage, coupled to the second input and the output from a last intermediate modulo stage, configured to generate a final residual value based on the modulus data and the output from the last intermediate modulo stage, and output the final residual value as a remainder.

In a further embodiment of the hardware accelerator, the hardware accelerator further includes a communication bus interface configured to receive at least a portion of an ANN model with ANN weights, and input data, and transmit output data; a memory, coupled to the CE and the communication bus interface, configured to store the portion of the ANN model, the ANN weights, the input data and the output data; and a controller, coupled to the CE, the communication bus interface and the memory. In this embodiment, the CE includes a plurality of multiply-and-accumulate (MAC) units.

In a further embodiment of the hardware accelerator, the ANN model is a convolutional neural network (CNN) model that includes an input layer, at least one convolutional layer configured to perform a residue number space (RNS)-based Winograd convolution, a fully connected layer and an output layer; and the MO unit is configured to provide the modulation operation at least during RNS-based Winograd convolution operations.

In a further embodiment of the hardware accelerator, the initial modulo stage includes a left hand shift (LHS) block including an input coupled to the second input, and an output; a comparator including a first input coupled to the first input, a second input, and an output; a sign block including a first input coupled to the first input, a second input coupled to the output of the LHS block, and an output coupled to the second input of the comparator; a subtractor including a first input coupled to the first input, a second input coupled to the output of the sign block, and an output; and a multiplexor including a first input coupled to the first input, a second input coupled to the output of the subtractor, a control input coupled to the output of the comparator, and an output configured to output a first residual value.

In a further embodiment of the hardware accelerator, each intermediate modulo stage includes an LHS block including an input coupled to the second input, and an output; a comparator including a first input configured to receive the output from the initial modulo stage or a preceding intermediate modulo stage, a second input, and an output; a subtractor including a first input configured to receive the output from the initial modulo stage or a preceding intermediate modulo stage, a second input coupled to the output of the LHS block, and an output; and the multiplexor includes a first input configured to receive the output from the initial modulo stage or a preceding intermediate modulo stage, a second input coupled to the output of the subtractor, a control input coupled to the output of the comparator, and an output configured to output an intermediate residual value.

In a further embodiment of the hardware accelerator, the final modulo stage includes an LHS block including an input coupled to the second input, and an output; a comparator including a first input configured to receive the output from the last intermediate modulo stage, a second input, and an output; a subtractor including a first input configured to receive the output from the last intermediate modulo stage, a second input coupled to the output of the LHS block, and an output; and the multiplexor includes a first input configured to receive the output from the last intermediate modulo stage, a second input coupled to the second input, a control input coupled to the output of the comparator, and an output configured to output the final residual value as the remainder.

In a further embodiment of the hardware accelerator, the sequence of intermediate modulo stages includes N intermediate modulo stages; the LHS block in the initial modulo stage is configured to perform an N bit left shift on the modulus data; the LHS block in each intermediate modulo stage is configured to perform a progressively smaller left shift on the modulus data; and the LHS block in the final modulo stage is configured to perform a −1 bit left shift or a 1 bit right shift on the modulus data.

In a further embodiment of the hardware accelerator, the LHS block in a first intermediate modulo stage in the sequence is configured to perform an N−1 bit left shift on the modulus data; the LHS block in the last intermediate modulo stage in the sequence is configured to perform a 0 bit left shift on the modulus data; and the LHS blocks in the remaining intermediate modulo stages in the sequence are configured to perform a left shift on the modulus data that is one bit less than the left shift performed by the LHS block in a preceding intermediate modulo stage.

In a further embodiment of the hardware accelerator, the modulus data has a value greater than or equal to 2(N) and less than 2(N+1).

In another embodiment, a modulo operation (MO) unit includes a first input configured to receive operand data representing an operand value; a second input configured to modulus data receive a modulus value; an initial modulo stage, coupled to the first input and the second input, configured to generate a first residual value based on the modulus data and the operand data, and output the first residual value; a sequence of intermediate modulo stages, coupled to the second input, each intermediate modulo stage configured to receive the output from the initial modulo stage or a preceding intermediate modulo stage, generate an intermediate residual value based on the modulus data and the output from the initial modulo stage or the preceding intermediate modulo stage, and output the intermediate residual value; and a final modulo stage, coupled to the second input and the output from a last intermediate modulo stage, and configured to generate a final residual value based on the modulus data and the output from the last intermediate modulo stage, and to output the final residual value as a remainder.

In a further embodiment of the MO unit, the initial modulo stage includes a left hand shift (LHS) block including an input coupled to the second input, and an output; a comparator including a first input coupled to the first input, a second input, and an output; a sign block including a first input coupled to the first input, a second input coupled to the output of the LHS block, and an output coupled to the second input of the comparator; a subtractor including a first input coupled to the first input, a second input coupled to the output of the sign block, and an output; and a multiplexor including a first input coupled to the first input, a second input coupled to the output of the subtractor, a control input coupled to the output of the comparator, and an output configured to output a first residual value.

In a further embodiment of the MO unit, each intermediate modulo stage includes an LHS block including an input coupled to the second input, and an output; a comparator including a first input configured to receive the output from the initial modulo stage or a preceding intermediate modulo stage, a second input, and an output; a subtractor including a first input configured to receive the output from the initial modulo stage or a preceding intermediate modulo stage, a second input coupled to the output of the LHS block, and an output; and the multiplexor includes a first input configured to receive the output from the initial modulo stage or a preceding intermediate modulo stage, a second input coupled to the output of the subtractor, a control input coupled to the output of the comparator, and an output configured to output an intermediate residual value.

In a further embodiment of the MO unit, the final modulo stage includes an LHS block including an input coupled to the second input, and an output; a comparator including a first input configured to receive the output from the last intermediate modulo stage, a second input, and an output; a subtractor including a first input configured to receive the output from the last intermediate modulo stage, a second input coupled to the output of the LHS block, and an output; and the multiplexor includes a first input configured to receive the output from the last intermediate modulo stage, a second input coupled to the second input, a control input coupled to the output of the comparator, and an output configured to output the final residual value as the remainder.

In a further embodiment of the MO unit, the sequence of intermediate modulo stages includes N intermediate modulo stages; the LHS block in the initial modulo stage is configured to perform an N bit left shift on the modulus data; the LHS block in each intermediate modulo stage is configured to perform a progressively smaller left shift on the modulus data; and the LHS block in the final modulo stage is configured to perform a −1 bit left shift or a 1 bit right shift on the modulus data.

In a further embodiment of the MO unit, the LHS block in a first intermediate modulo stage in the sequence is configured to perform an N−1 bit left shift on the modulus data; the LHS block in the last intermediate modulo stage in the sequence is configured to perform a 0 bit left shift on the modulus data; and the LHS blocks in the remaining intermediate modulo stages in the sequence are configured to perform a left shift on the modulus data that is one bit less than the left shift performed by the LHS block in a preceding intermediate modulo stage.

In a further embodiment of the MO unit, the modulus data has a value greater than or equal to 2(N) and less than 2(N+1).

In another embodiment, a method for performing a modulo operation in a modulo operation unit includes receiving operand data representing an operand value and modulus data representing a modulus value; and generating a remainder based on the operand data and the modulus data which includes generating, by an initial modulo stage, a first residual value, generating, by a sequence of intermediate modulo stages, a sequence of intermediate residual values, and generating, by a final modulo stage, a final residual value as the remainder.

In a further embodiment of the method, the initial modulo stage generates the first residual value based on the modulus data and the operand data, and outputs the first residual value; each intermediate modulo stage receives the output from the initial modulo stage or a preceding intermediate modulo stage, generates the intermediate residual value based on the modulus data and the output from the initial modulo stage or the preceding intermediate modulo stage, and outputs the intermediate residual value; and the final modulo stage receives the output from a last intermediate modulo stage, generates the final residual value based on the modulus data and the output from the last intermediate modulo stage, and outputs the final residual value.

In a further embodiment of the method, the sequence of intermediate modulo stages includes N intermediate modulo stages.

In a further embodiment of the method, the modulus data has a value greater than or equal to 2(N) and less than 2(N+1).

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator for execution of an artificial neural network (ANN), comprising:
   a computing engine (CE); and
   a modulo operation (MO) unit, coupled to the CE, configured to provide a modulo operation during ANN operations, the MO unit including:
      a first input configured to receive an operand value of the modulo operation,
      a second input configured to receive a modulus value of the modulo operation,
      an initial modulo stage, coupled to the first input and the second input, configured to generate a first residual value based on the modulus data and the operand data, and output the first residual value,
      a sequence of intermediate modulo stages, coupled to the second input, each intermediate modulo stage configured to receive the output from the initial modulo stage or a preceding intermediate modulo stage, generate an intermediate residual value based on the modulus data and the output from the initial modulo stage or the preceding intermediate modulo stage, and output the intermediate residual value, and
      a final modulo stage, coupled to the second input and the output from a last intermediate modulo stage, configured to generate a final residual value based on the modulus data and the output from the last intermediate modulo stage, and output the final residual value as a remainder value of the modulo operation.

2. The hardware accelerator of claim 1, further comprising:
   a communication bus interface configured to:
      receive at least a portion of an ANN model with ANN weights, and input data, and
      transmit output data;
   a memory, coupled to the CE and the communication bus interface, configured to store the portion of the ANN model, the ANN weights, the input data and the output data; and
   a controller, coupled to the CE, the communication bus interface and the memory,
   where the CE includes a plurality of multiply-and-accumulate (MAC) units.

3. The hardware accelerator of claim 2, where:
   the ANN model is a convolutional neural network (CNN) model that includes an input layer, at least one convolutional layer configured to perform a residue number space (RNS)-based Winograd convolution, a fully-connected layer and an output layer; and
   the MO unit is configured to provide the modulation operation at least during RNS-based Winograd convolution operations.

4. The hardware accelerator of claim 1, where the initial modulo stage includes:
   a left hand shift (LHS) block including an input coupled to the second input, and an output;
   a comparator including a first input coupled to the first input, a second input, and an output;
   a sign block including a first input coupled to the first input, a second input coupled to the output of the LHS block, and an output coupled to the second input of the comparator;
   a subtractor including a first input coupled to the first input, a second input coupled to the output of the sign block, and an output; and
   a multiplexor including a first input coupled to the first input, a second input coupled to the output of the subtractor, a control input coupled to the output of the comparator, and an output configured to output a first residual value.

5. The hardware accelerator of claim 4, where each intermediate modulo stage includes:
   an LHS block including an input coupled to the second input, and an output;
   a comparator including a first input configured to receive the output from the initial modulo stage or a preceding intermediate modulo stage, a second input, and an output;
   a subtractor including a first input configured to receive the output from the initial modulo stage or a preceding intermediate modulo stage, a second input coupled to the output of the LHS block, and an output; and
   the multiplexor includes a first input configured to receive the output from the initial modulo stage or a preceding intermediate modulo stage, a second input coupled to the output of the subtractor, a control input coupled to the output of the comparator, and an output configured to output an intermediate residual value.

6. The hardware accelerator of claim 5, where the final modulo stage includes:
   an LHS block including an input coupled to the second input, and an output;
   a comparator including a first input configured to receive the output from the last intermediate modulo stage, a second input, and an output;
   a subtractor including a first input configured to receive the output from the last intermediate modulo stage, a second input coupled to the output of the LHS block, and an output; and
   the multiplexor includes a first input configured to receive the output from the last intermediate modulo stage, a second input coupled to the second input, a control input coupled to the output of the comparator, and an output configured to output the final residual value as the remainder.

7. The hardware accelerator of claim 6, where:
   the sequence of intermediate modulo stages includes N intermediate modulo stages;
   the LHS block in the initial modulo stage is configured to perform an N bit left shift on the modulus data;
   the LHS block in each intermediate modulo stage is configured to perform a progressively smaller left shift on the modulus data; and
   the LHS block in the final modulo stage is configured to perform a −1 bit left shift or a 1 bit right shift on the modulus data.

8. The hardware accelerator of claim 7, where:
   the LHS block in a first intermediate modulo stage in the sequence is configured to perform an N−1 bit left shift on the modulus data;

the LHS block in the last intermediate modulo stage in the sequence is configured to perform a 0 bit left shift on the modulus data; and the LHS blocks in the remaining intermediate modulo stages in the sequence are configured to perform a left shift on the modulus data that is one bit less than the left shift performed by the LHS block in a preceding intermediate modulo stage.

9. The hardware accelerator of claim 7, where the modulus data has a value greater than or equal to $2^{(N)}$ and less than $2^{(N+1)}$.

10. A modulo operation (MO) unit, comprising:
a first input configured to receive an operand value for a modulo operation;
a second input configured to data receive a modulus value for the modulo operation;
an initial modulo stage, coupled to the first input and the second input, configured to generate a first residual value based on the modulus data and the operand data, and output the first residual value;
a sequence of intermediate modulo stages, coupled to the second input, each intermediate modulo stage configured to receive the output from the initial modulo stage or a preceding intermediate modulo stage, generate an intermediate residual value based on the modulus data and the output from the initial modulo stage or the preceding intermediate modulo stage, and output the intermediate residual value; and
a final modulo stage, coupled to the second input and the output from a last intermediate modulo stage, and configured to generate a final residual value based on the modulus data and the output from the last intermediate modulo stage, and to output the final residual value as a remainder value of the modulo operation.

11. The MO unit of claim 10, where the initial modulo stage includes:
a left hand shift (LHS) block including an input coupled to the second input, and an output;
a comparator including a first input coupled to the first input, a second input, and an output;
a sign block including a first input coupled to the first input, a second input coupled to the output of the LHS block, and an output coupled to the second input of the comparator;
a subtractor including a first input coupled to the first input, a second input coupled to the output of the sign block, and an output; and
a multiplexor including a first input coupled to the first input, a second input coupled to the output of the subtractor, a control input coupled to the output of the comparator, and an output configured to output a first residual value.

12. The MO unit of claim 11, where each intermediate modulo stage includes:
an LHS block including an input coupled to the second input, and an output;
a comparator including a first input configured to receive the output from the initial modulo stage or a preceding intermediate modulo stage, a second input, and an output;
a subtractor including a first input configured to receive the output from the initial modulo stage or a preceding intermediate modulo stage, a second input coupled to the output of the LHS block, and an output; and
the multiplexor includes a first input configured to receive the output from the initial modulo stage or a preceding intermediate modulo stage, a second input coupled to the output of the subtractor, a control input coupled to the output of the comparator, and an output configured to output an intermediate residual value.

13. The MO unit of claim 12, where the final modulo stage includes:
an LHS block including an input coupled to the second input, and an output;
a comparator including a first input configured to receive the output from the last intermediate modulo stage, a second input, and an output;
a subtractor including a first input configured to receive the output from the last intermediate modulo stage, a second input coupled to the output of the LHS block, and an output; and
the multiplexor includes a first input configured to receive the output from the last intermediate modulo stage, a second input coupled to the second input, a control input coupled to the output of the comparator, and an output configured to output the final residual value as the remainder.

14. The MO unit of claim 13, where:
the sequence of intermediate modulo stages includes N intermediate modulo stages;
the LHS block in the initial modulo stage is configured to perform an N bit left shift on the modulus data;
the LHS block in each intermediate modulo stage is configured to perform a progressively smaller left shift on the modulus data; and
the LHS block in the final modulo stage is configured to perform a −1 bit left shift or a 1 bit right shift on the modulus data.

15. The MO unit of claim 14, where:
the LHS block in a first intermediate modulo stage in the sequence is configured to perform an N−1 bit left shift on the modulus data;
the LHS block in the last intermediate modulo stage in the sequence is configured to perform a 0 bit left shift on the modulus data; and
the LHS blocks in the remaining intermediate modulo stages in the sequence are configured to perform a left shift on the modulus data that is one bit less than the left shift performed by the LHS block in a preceding intermediate modulo stage.

16. The MO unit of claim 14, where the modulus data has a value greater than or equal to $2^{(N)}$ and less than $2^{(N+1)}$.

17. A method for performing a modulo operation, comprising:
at a modulo operation unit including a first input, a second input, an initial modulo stage, a sequence of intermediate modulo stages and a final module stage:
receiving, at the first input, an operand value of the modulo operation;
receiving, at the second input, a modulus value of the modulo operation; and
generating a remainder based on the operand data and the modulus data, including:
generating, by the initial modulo stage, a first residual value,
generating, by the sequence of intermediate modulo stages, a sequence of intermediate residual values, and
generating, by the final modulo stage, a final residual value as the remainder value of the modulo operation, and
outputting, by the final modulo stage, the remainder value of the modulo operation.

18. The method of claim 17, where:

the initial modulo stage generates the first residual value based on the modulus data and the operand data, and outputs the first residual value;

each intermediate modulo stage receives the output from the initial modulo stage or a preceding intermediate modulo stage, generates the intermediate residual value based on the modulus data and the output from the initial modulo stage or the preceding intermediate modulo stage, and outputs the intermediate residual value; and the final modulo stage receives the output from a last intermediate modulo stage, generates the final residual value based on the modulus data and the output from the last intermediate modulo stage, and outputs the final residual value.

19. The method of claim 18, where the sequence of intermediate modulo stages includes N intermediate modulo stages.

20. The method of claim 19, where the modulus data has a value greater than or equal to $2^{(N)}$ and less than $2^{(N+1)}$.

\* \* \* \* \*